Inventor
Harold L. Dobrikin
by Parker & Carter
Attorneys

July 3, 1962 H. L. DOBRIKIN 3,042,061
AUTOMATIC SHUTTLE SAFETY VALVE
Filed Nov. 8, 1956 4 Sheets-Sheet 3

Inventor
Harold L. Dobrikin
by Parker & Carter
Attorneys

Inventor
Harold L. Dobrikin
by Parker & Carter
Attorneys 3,042,061
AUTOMATIC SHUTTLE SAFETY VALVE
Harold L. Dobrikin, Chicago, Ill., assignor, by mesne assignments, to Berg Airlectro Products Co., Chicago, Ill., a corporation of Illinois
Filed Nov. 8, 1956, Ser. No. 621,077
8 Claims. (Cl. 137—102)

This invention relates to safety control valves and has particular relation to a control valve usable in association with air brake systems for truck trailers and the like.

One purpose of the invention is to provide a control valve which shall be operable by a vehicle operator.

Another purpose is to provide a safety control valve which shall be fool-proof and shall insure against operation of vehicles and the like under unsafe conditions.

Another purpose is to provide a safety control valve incorporating automatic indicator means.

Another purpose is to provide a safety control valve which shall be automatically effective to accomplish the purposes desired.

Another purpose is to provide a safety control valve comprising a minimum of parts and of maximum economy in manufacture.

Another purpose is to provide a dual valve structure incorporating manually and automatically operable elements.

Other purposes will appear from time to time in the course of the specification and claims.

I illustrate my invention more or less diagrammatically in the accompanying drawings wherein.

Like parts are indicated by like symbols throughout the specification and drawings.

It should be understood that, while it may have many uses in a variety of installations, the control valve disclosed herein has a particularly advantageous function in association with the air-brake system of a tractor and trailer combination. It is important with such vehicles to insure the availability of braking action applicable to the trailer under all circumstances.

Such systems normally incorporate a compressor mounted on the tractor and operated by the engine of the tractor. The compressor supplies air to a reservoir, suitable lines and a series of relays, all effective to provide braking action on the tractor and the trailer. The breakaway valve is effective to provide an air conduit to the brakes of the trailer which may bypass the normal air-brake line to the trailer brakes and be available in case of breakage or leakage in the normal line. It is accordingly one purpose of my invention to provide a control valve preferably mounted on the dash board of the tractor or at any suitable place available to the operator of the vehicle, which control valve should be effective to permit the operator to charge the emergency brake system of the trailer and which shall nonetheless contain automatically operable features effective to apply the brakes of the trailer upon the occurrence of an emergency situation, such as a drop of pressure in the system below a given point, the automatic operation thereof being effective to preclude the operator of the vehicle from attempting to operate the same without brakes or with only the tractor brakes available.

Figure 1:
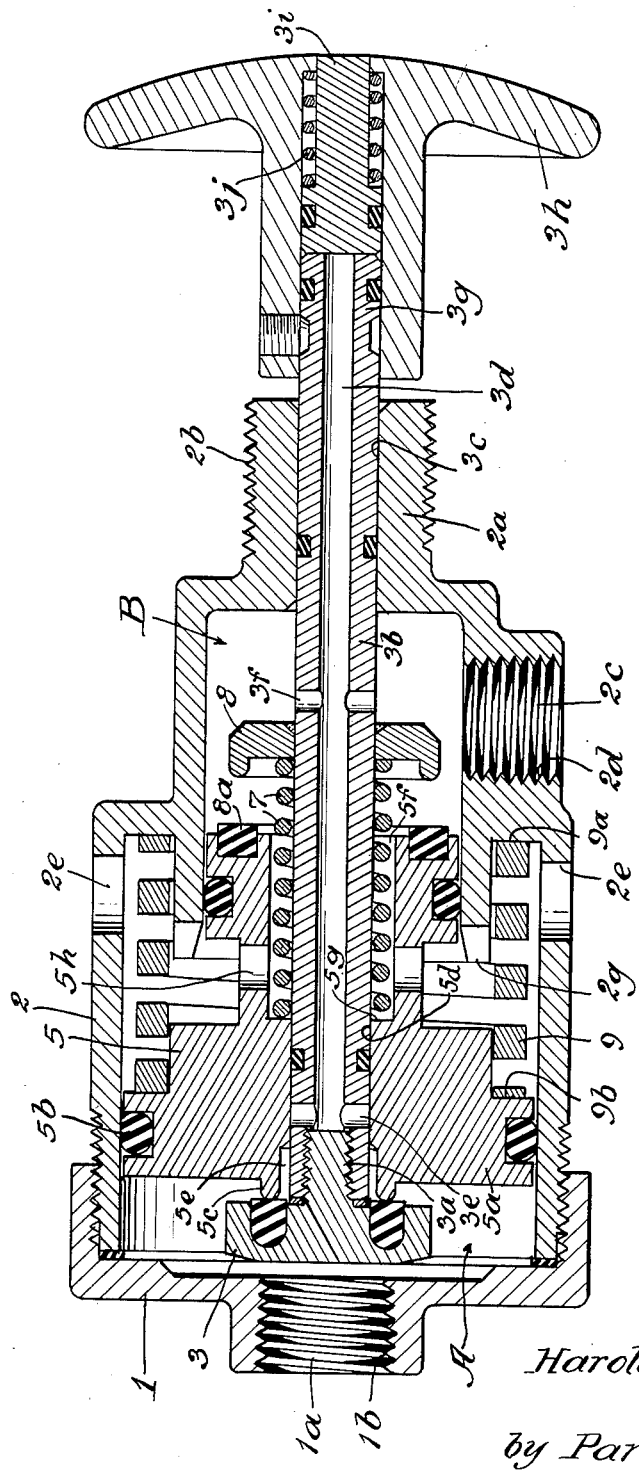
FIGURE 1 is a side elevation in cross-section illustrating a control valve of my invention in a position assumed in the absence of any air pressure in a brake system controlled thereby.

Referring now to the drawings, and particularly to FIGURE 1, the numeral 1 generally indicates an end cap threadedly engaged with the left-hand end portion of the main valve housing 2. For convenience herein, as the parts are shown in the drawings, the location and movement of parts may be described as "left" and "right." The end cap 1 has a generally centrally located air pressure inlet opening 1a which may be fitted as at 1b to provide for connection with an air pressure hose or line. It will be observed that the end cap 1 closes the left-hand open end of the valve housing or cylinder 2 except for the inlet 1a.

A valve member 3 may be secured as at 3a to a valve stem 3b, slidably mounted in the valve housing 2, as indicated generally at 3c, at which point the elongated stem 3b which extends substantially throughout the entire length of the housing 2 and outwardly therebeyond is slidably mounted in a boss 2a, the outer cylindrical wall of which may be threaded as at 2b to provide for securing, for example, to the dashboard of a vehicle. The valve stem 3b has a central or axially disposed air passage 3d with which laterally disposed air passages 3e communicate adjacent the left-hand end of the stem 3b and lateral air passages 3f communicate at a point intermediate the ends of the stem 3b and adjacent the right-hand portion of the cylinder or valve housing 2. It will be understood that the passages 3e are effective to bring the central passage 3d of the stem 3b into communication with a valve housing chamber A, at certain positions of the parts of my invention, the chamber A being located in the left-hand section of the valve housing 2 and including an annular portion at one of the ends of chamber A. Similarly, the passages 3f are effective to bring the air passage 3d of the stem 3b into communication with a valve chamber B in the right-hand portion of the valve housing 2. As will be further described, the chambers A and B are on opposite sides of a shuttle member 5. The stem 3b has an outwardly extending end portion 3g on which is mounted the manually operable handle element 3h. Slidably mounted within the handle 3h is an indicator plug 3i held inwardly against the end 3g of the stem 3b to close the open outer end of the air passage 3d, the spring 3j being effective to urge the indicator plug 3i against the stem end 3g for this purpose. It will be observed that the spring 3j has its opposite ends in engagement respectively with the handle 3h and the enlarged inner end of the plug 3i.

The valve housing 2 has an outlet 2c communicating with chamber B of the housing. The outlet 2c may be threaded as indicated at 2d to provide for securing therein of an air hose or line connected at its opposite end, for example, to the above-described breakaway valve. The valve housing 2 similarly may be apertured as indicated at 2e to provide for venting of the housing 2 and the chamber B thereof as will be further described hereinbelow.

A shuttle assembly generally indicated at 5 may comprise a piston member 5a surrounding and slidably mounted about the stem 3b. The piston 5a has its outer cylindrical wall slidably mounted along the inner cylindrical wall of the chamber A of the housing 2 and carries a seal 5b in contact with said housing wall to preclude the passage of air entering the inlet 1a between the walls of the piston 5a and the housing 2. The piston 5a carries a valve seat 5c at its outer or left face, the seat 5c surrounding the central aperture in the piston 5a through which the stem 3b extends. It will be observed that the aperture 5d through which the stem 3 extends is enlarged or recessed adjacent its left-hand end, the seat 5c serving to define the enlargement 5e of the central aperture 5d in the piston 5a, the purposes of which will appear hereinbelow. It is sufficient to note at this point that the recessed or enlarged opening 5e is of a depth insufficient to bring it into communication with the laterally disposed air passages 3e in the stem 3b when the valve 3 is on the seat 5c but is of sufficient extension to permit said communication when the valve 3 has moved a sufficient distance off its seat 5c.

The central or axial opening 5d in the piston 5a has a second and larger enlarged or recessed portion 5f at its opposite end. Positioned within the well 5f and surrounding the stem 3b therein is a spring element 7 which has one of its ends in engagement with the piston 5a as indicated at 5g and its opposite end in engagement with a valve element 8 mounted on the stem 3b within the chamber B. The piston 5a carries on its end face within the chamber B a seat 8a for the valve 8. It should be observed at this point that the well or opening 5f normally communicates with the chamber B of the valve housing 2 when the valve 8 is off its seat 8a.

Laterally disposed air passages 5h are formed in the cylindrical wall of the shuttle member 5 intermediate its ends and serve to bring the well or opening 5f into communication with the chamber A. Since the vent openings 2e are in communication with the chamber A of the housing 2 it will be observed that the lateral passages 5h are effective to bring the chamber B into communication with the vent openings 2e and therethrough into communication with the atmosphere when the valve 8 is off its seat 8a. A second spring element 9 is positioned within the housing 2 and has one of its ends seated in the annular end portion of chamber A thereof, its opposite ends being in engagement with a portion of the housing 2 as at 9a and with the shuttle 5 as at 9b to urge the shuttle 5 toward the left as the parts are shown in the drawings.

Whereas I have described and illustrated a practical and operative device, nevertheless, many changes may be made in the size, shape, number and disposition of parts without departing from the spirit of my invention. I therefore wish my description and drawings to be taken as in a broad sense illustrative or diagrammatic, rather than as limiting me to my precise showing.

The use and operation of my invention are as follows:

I provide a safety control valve comprising two valves in one valve body. One such valve is entirely automatic and beyond the control of the operator. Thus the shuttle assembly 5 is free to slide within the body 2 either to right or left, its movement being controlled by air pressure through the inlet 1a into chamber A and acting upon the shuttle 5 and piston 5a thereof, the amount of piston movement being controlled by spring 9 positioned to act in opposition to the pressure entering the chamber A through the inlet 1a. The manually operable valve element under the control of the operator comprises a shaft assembly, the basic element of which is the stem 3b, the shaft assembly being free to slide within the valve body 2 and within the shuttle assembly 5.

FIGURE 1 shows the valve of my invention with the parts in the position obtaining when there is no air pressure in the tractor or the trailer. Since no air pressure exists in chamber A, spring 9 has forced the shuttle assembly through its full travel to the left, as the parts are shown in the drawings, thus seating the valve 3 on the seat 5c.

Figure 2:
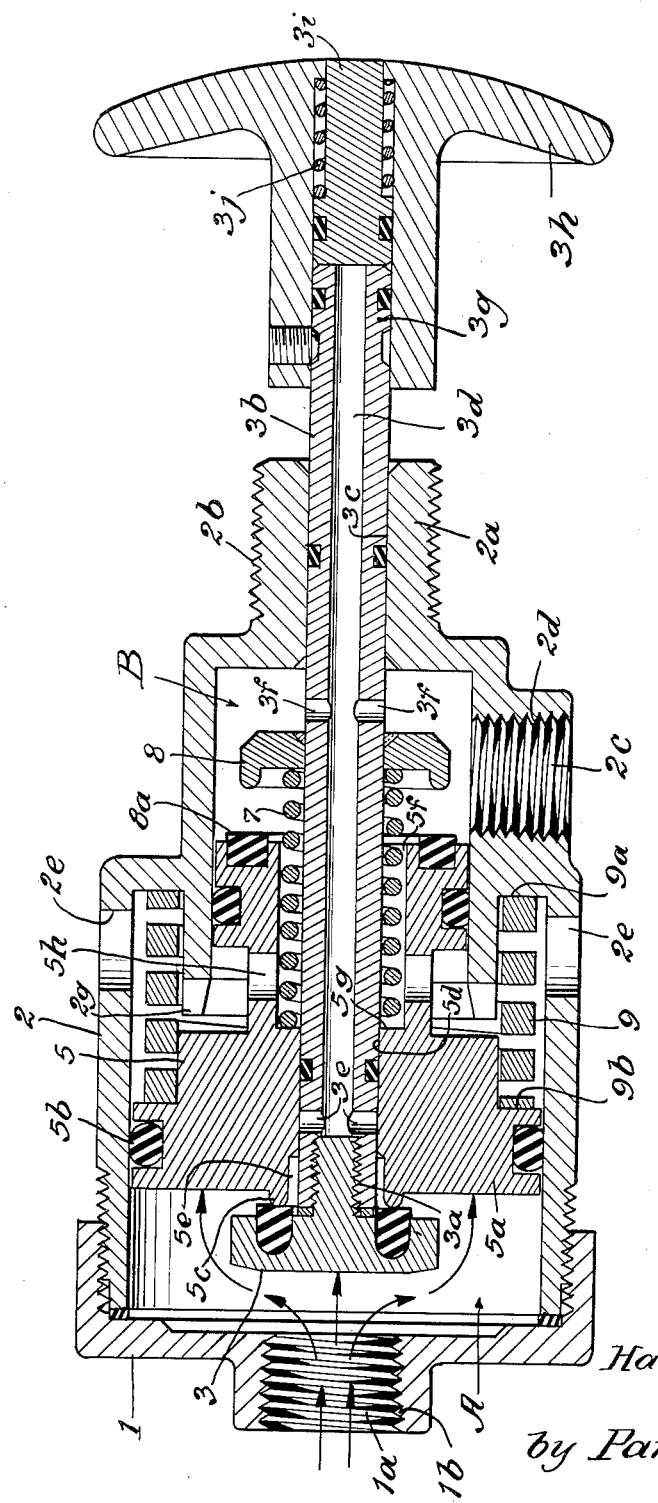
FIGURE 2 is a view similar to that of FIGURE 1 and illustrating a control valve of my invention in the position assumed as pressure begins to build up in a controlled system.

As pressure begins to build up in chamber A, from the compressor on the tractor, as indicated by the arrows in FIGURE 2, the piston 5a begins to move to the right against the action of the spring 9. The valve 3 remains seated on its seat 5c as a result of the combination of forces exerted by the spring 7 in one direction and the air pressure entering through inlet 1a and acting against the outer or left hand face of the valve 3. The air entering the valve of my invention under pressure is illustrated in each of the drawings herein by the arrows and in FIGURE 2 the arrows can be seen as directed against the outer or left hand face of the piston 5a and the outer or left hand face of the valve 3. Should the operator attempt at this time to charge the trailer emergency brake system through the control valve and the breakaway valve by pushing inwardly on the indicator to move the stem 3b to the left and thus to unseat the valve 3 and permit flow of air pressure through the lateral passages 3e and central stem passage 3d the stem 3b would reach a stop with the valve 3 against end cap 1, as seen in FIGURE 1, before the valve 8 is seated on its seat 8a. Thus in that event the operator would succeed only in venting the air outwardly through the vents 2e to atmosphere.

Figure 3:
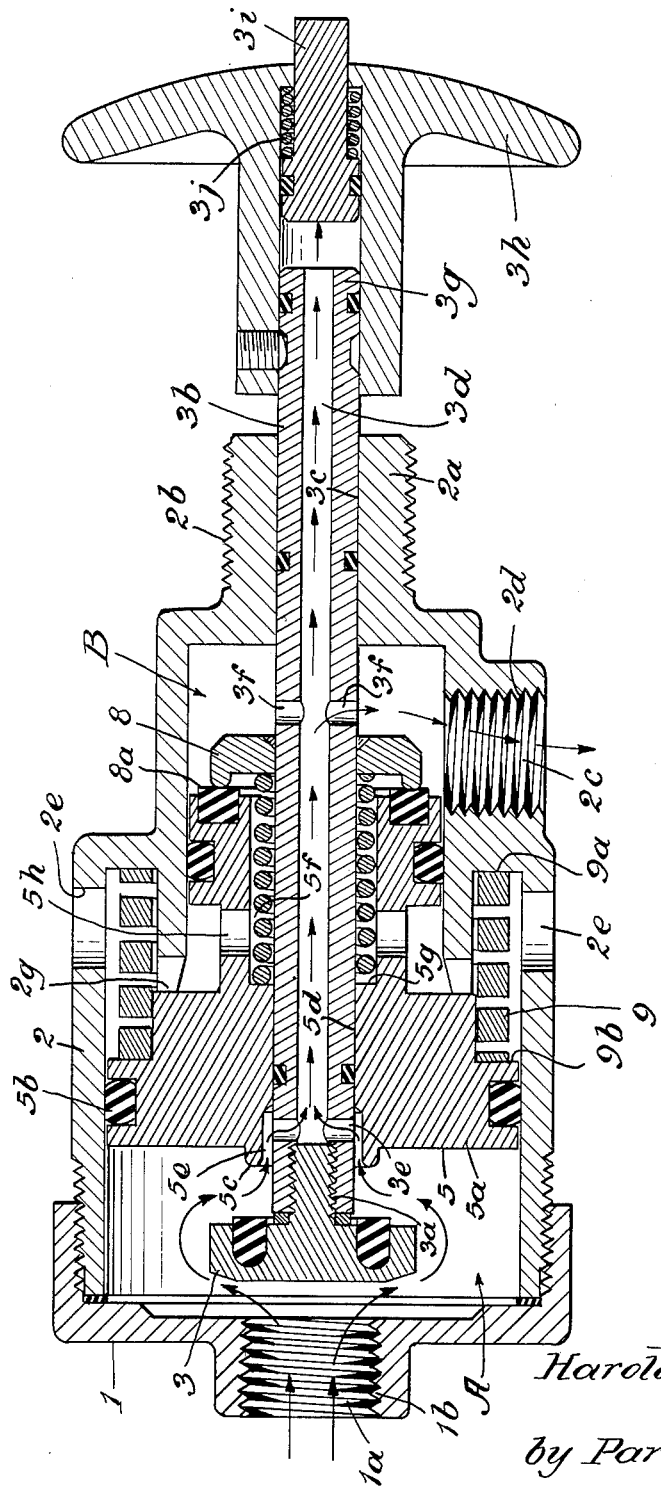
FIGURE 3 is a view similar to that of FIGURE 1 illustrating a control valve of my invention in the position assumed when a vehicle system air line, for example, has been charged and the control valve has been operated to accomplish said charging.

Referring now to FIGURE 3, it will be observed that the air pressure has built up to a point sufficient to move the shuttle assembly 5 its full travel to the right and to bring it against a stop 2g formed integrally with the housing 2 and extending axially into the chamber A. The air pressure necessary to accomplish the full travel of the chamber 5a against the action of the spring 9 may, of course, be suitably adjusted. I find 40 lbs. to be preferable. It will be observed that movement of the shuttle 5 through its full travel to the right is accompanied by a similar full travel of the valve 3 and stem 3b to which it is attached to the right, thus moving the handle element 3h to its outermost position. The operator now knows that the system is in condition to permit charging of the trailer brake system.

Referring now to FIGURE 3 it can be seen that the operator has moved the handle element 3h inwardly to charge the trailer emergency brake system. Movement of the handle element 3h inwardly is effective to move the valve 3 off its seat 5c and to move the lateral air inlet passages 3e to the left through the shuttle 5 and to bring them into registry with the opening or well 5e in the shuttle 5 which, upon unseating of the valve 3, is brought into communication with the chamber A and thus open to the air pressure entering through inlet 1a. As may be seen by the arrows the air entering inlet 1a and chamber A is thus directed into the central passage 3d in the stem 3b. Similarly, movement of the stem 3b inwardly by the operator is effective to seat the valve 8 on the seat 8a and thus to close chamber B against the vent passage through the well 5f, passages 5h and vent openings 2e.

As indicated by the arrows, the air pressure in the central passage 3d is permitted to pass through the lateral passages 3f in the stem 3d and thus into chamber B from whence it moves through the outlet 2c and through suitable conductors to the breakaway valve and thus to the trailer brake system. At the same time the air pressure in the central passage 3d is effective to hold the indicator plug 3i outwardly against the action of the spring 3j to cause the outer end of the indicator to extend beyond the handle element 3h and thus to inform the operator by visual indication that the trailer system is, in fact, charged.

It is now fully safe to operate the tractor and trailer combination.

Figure 4:
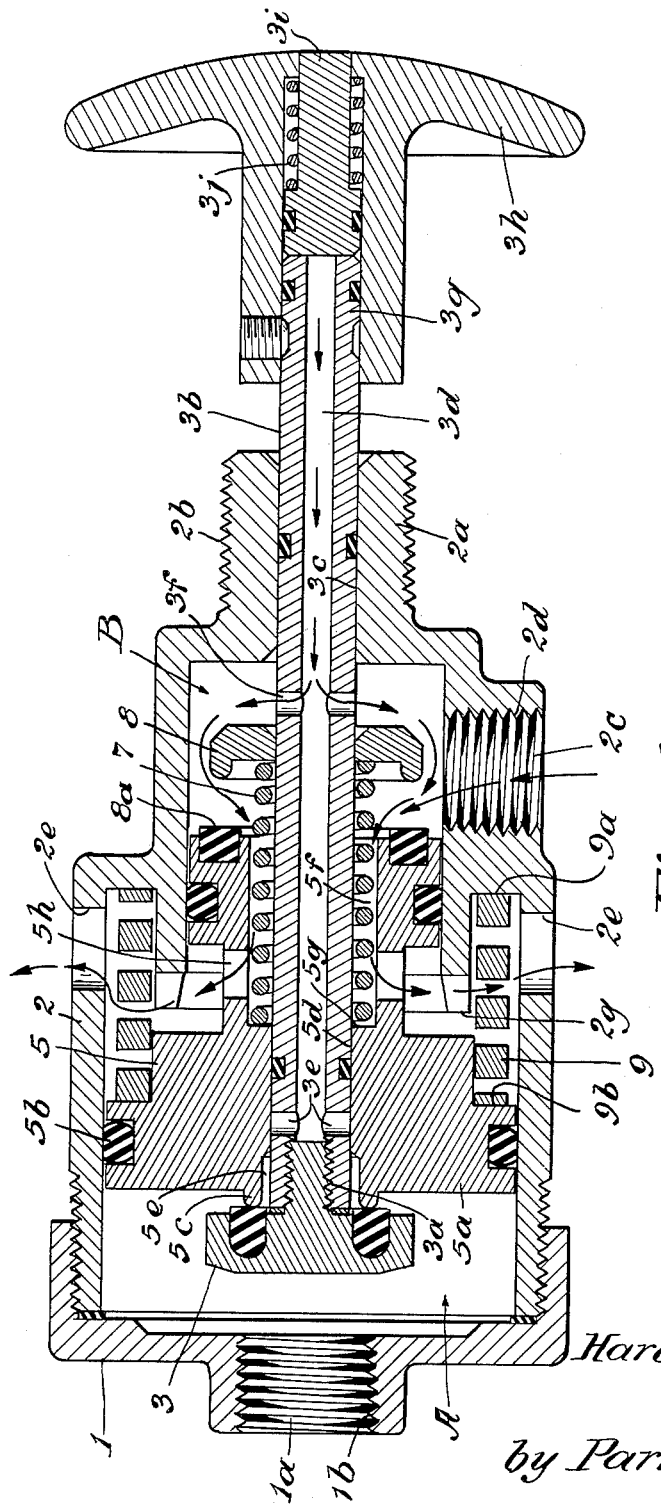
FIGURE 4 is a view similar to that of FIGURE 2 illustrating a valve of my invention in the position assumed upon a drop of pressure in a controlled system below a given point.

Should any malfunction of the air system cause a drop in pressure, the spring 9 will readily begin to move the shuttle element 5 to the left because of insufficient pressure in chamber A, as indicated in FIGURE 4. Further or continued reduction of pressure will permit shuttle 5 under the influence of spring 9 to move further to the left thus unseating the valve 8 from its seat 8a. When this happens the valve of my invention will automatically begin to assume the position illustrated in FIGURE 4, i.e., the spring 7, acting on the valve element 8 fixed on the stem 3b will move the stem outwardly to close the valve 3 against its seat 5c and prevent any further air pressure moving from the tractor compressor into chamber B and toward the breakaway valve through the outlet 2c. At the same time movement of the element 8 off its seat 8a opens the chamber B and thus the breakaway valve connection 2c through the well 5f, outlet passages or orifices 5h, and chamber A, through the atmosphere vents 2e. It will be understood that the breakaway valve is so constructed that loss of pressure to the atmosphere in this manner causes immediate application of the trailer emergency brakes. It will be further observed that loss of pressure in the central stem passage 3d permits the spring 3j to return the indicator inwardly within the handle 3h thus providing a visual indication to the operator of a loss of inlet pressure from the tractor.

I claim:

1. A safety control valve for air pressure brake systems and the like comprising a valve housing, an air pressure inlet in said housing, a valve stem slidable in said housing and having a portion extending outwardly therefrom, a handle element secured to said outwardly extending stem portion, a pair of valve elements fixed on said stem and spaced one from the other within said valve housing, a shuttle member slidably mounted in said housing between said valve elements, valve seats on the opposite faces of said shuttle member, a first yielding means positioned to urge said shuttle member against one of said valve elements in opposition to air pressure entering said inlet, a second yielding means positioned to urge said last named valve element toward its seat, an air pressure outlet in said housing, and air passage means formed in said shuttle assembly and said stem and effective when said last named valve element is off its seat to bring said valve housing inlet and outlet into communication one with the other.

2. A safety control valve for air pressure brake systems and the like, comprising a valve housing, an air pressure inlet in said housing, an air pressure outlet in said housing, a valve shuttle slidably mounted in said housing and positioned to move therewithin in response to air pressure entering said inlet, valve means associated with said shuttle and positioned to bring said outlet into communication with said inlet in response to a rise of air pressure within said housing to a predetermined amount, said housing having a vent passage, said valve means including a portion positioned to place said outlet and said vent passage in communication in response to a drop in air pressure within said housing below a predetermined point, said valve means including a stem slidable in said shuttle and extending outwardly of said housing and valve members fixed on said stem at opposite ends of said shuttle.

3. A safey control valve for air pressure systems and the like comprising a valve housing, a piston slidably mounted in said housing and dividing said housing into at least a pair of chambers, an air pressure inlet in one of said chambers, an air pressure outlet in the other of said chambers, an air passage in said piston positioned to place said chambers in communication one with the other, valve means associated with said piston and effective to open and close said passage, yielding means in said housing effective to urge said piston towards said inlet, said valve means including a stem slidable in said piston and extending outwardly of said housing and valve members fixed on said stem at opposite ends of said piston.

4. A safety control valve for air pressure systems and the like comprising a valve housing, a piston slidably mounted in said housing and dividing said housing into at least a pair of chambers, an air pressure inlet in one of said chambers, an air pressure outlet in the other of said chambers, an air passage in said piston positioned to place said chambers in communication one with the other, valve means associated with said piston within said chamber having said inlet, said valve means being effective to open and close said passage, yielding means in said housing effective to urge said piston towards said inlet, said valve means having a manually operable portion extending outwardly from said housing.

5. A safety control valve for air pressure systems and the like comprising a valve housing, an air pressure inlet in said housing, a shuttle valve assembly in said housing and movable in response to air pressure therewithin, yielding means in said housing effective to urge said assembly in a direction opposite to that in which it is urged by said air pressure in response to a drop in air pressure entering said housing below a predetermined amount, an air pressure outlet in said housing, said assembly including a manually operable member extending within and outwardly from said housing and a shuttle member slidably mounted on said operable member within said housing, said manually operable member and said shuttle member cooperating to control communication between said inlet and said outlet.

6. A safety control valve for air pressure systems and the like comprising a valve housing, an air pressure inlet in said housing, a shuttle valve assembly in said housing and movable in response to air pressure therewithin, yielding means in said housing effective to urge said assembly in a direction opposite to that in which it is urged by said air pressure in response to a drop in air pressure entering said housing below a predetermined amount, an air pressure outlet in said housing, said assembly including a manually operable element extending within and outwardly from said housing and a shuttle member slidable on said element, said manually operable element and said shuttle member cooperating to control communication between said inlet and said outlet, said housing and valve shuttle assembly having vent means effective automatically to vent the inlet of said housing to atmosphere upon a drop of pressure in said inlet below a predetermined amount.

7. A safety control valve comprising a housing, an air pressure inlet in said housing, a valve shuttle slidably mounted in said housing, a spring in said housing operable aganist one side of said shuttle, valve means slidably receiving said shuttle, said valve means having a manually operable portion extending outwardly from said housing, said shuttle, valve means and manually operable portion being movable in one direction in response to air pressure entering said housing and movable in the opposite direction in response to the urging of said spring and a drop of said entering pressure below a predetermined amount, an air pressure outlet in said housing, said valve means including a portion operable in response to movement of said manually operable portion to permit passage of air between said inlet and said outlet when said entering air pressure is above a predetermined amount, and to preclude said passage of air between said inlet and said outlet when said entering air pressure is below said predetermined amount.

8. A safety control valve comprising a housing, an air inlet in said housing, an air outlet in said housing, a valve shuttle member slidably mounted in said housing between said inlet and said outlet, an air passage in said shuttle member positioned to place said inlet and said outlet in communication one with the other, a valve stem slidable in said passage and in said housing, said valve stem having a valve element positioned between said shuttle member and said inlet and effective to close the inlet end of said passage and a manually operable portion extending outside said housing, a second valve means on said valve stem positioned to close the opposite end of said passage, yielding means in said housing effective to urge said shuttle member toward said housing inlet, air passage means in said stem and extending from a point adjacent the inlet end of said shuttle member passage to a point beyond said shuttle member and said last named valve element, said stem passage having an outlet positioned to direct air to said housing outlet, a vent passage in said shuttle member and a vent opening in said housing, said first named valve element being effective to close said shuttle passage and said stem passage, said second named valve element being effective to close said vent passage.

References Cited in the file of this patent

UNITED STATES PATENTS

| | | |
|---|---|---|
| 932,887 | McDaniel | Aug. 31, 1909 |
| 1,134,352 | Schneider | Apr. 6, 1915 |
| 2,484,628 | Le Valley | Oct. 11, 1949 |
| 2,638,108 | Williams et al. | May 12, 1953 |
| 2,645,239 | Horn et al. | July 14, 1953 |
| 2,702,044 | Johnson | Feb. 15, 1955 |
| 2,811,979 | Presnell | Nov. 5, 1957 |
| 2,816,563 | Pappas | Dec. 17, 1957 |

FOREIGN PATENTS

| | | |
|---|---|---|
| 623,231 | France | June 21, 1927 |
| 858,199 | Germany | Dec. 4, 1952 |